US011905745B2

(12) United States Patent
Papoulias

(10) Patent No.: US 11,905,745 B2
(45) **Date of Patent: *Feb. 20, 2024**

(54) DOOR HINGE LIMITER FOR AUTOMOTIVE VEHICLE

(71) Applicant: Michael A Papoulias, Jackson, MI (US)

(72) Inventor: Michael A Papoulias, Jackson, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,299

(22) Filed: Jun. 2, 2023

(65) Prior Publication Data

US 2023/0340814 A1 Oct. 26, 2023

Related U.S. Application Data

(63) Continuation of application No. 17/957,728, filed on Sep. 30, 2022, now Pat. No. 11,725,435.

(Continued)

(51) Int. Cl.
*E05C 17/36* (2006.01)
*E05D 11/10* (2006.01)
(Continued)

(52) U.S. Cl.
CPC .............. *E05C 17/36* (2013.01); *E05C 17/04* (2013.01); *E05D 11/10* (2013.01); *E05F 5/06* (2013.01)

(58) Field of Classification Search
CPC ........ E05C 17/36; E05C 17/04; E05C 17/045; E05C 17/12; E05C 17/14; E05C 17/16;
(Continued)

(56) References Cited

U.S. PATENT DOCUMENTS 1,313,612 A * 8/1919 Stoiber ..................... E05F 1/16 16/78
1,358,519 A * 11/1920 Carter ................... E05C 17/203 49/386

(Continued)

FOREIGN PATENT DOCUMENTS

| | | | |
|---|---|---|---|
| CN | 102661097 | A | 9/2012 |
| EP | 2927408 | A1 | 10/2015 |
| EP | 3805497 | A1 | 4/2021 |

OTHER PUBLICATIONS

Amazon, Mekar Updated Adjustable Door Limiting Check Strap Left & Right Load 1000 Lb Nylon Belt Comaptible with Jeep Wrangler TJ JK JL—2PCS—Gray, Retrieved from the internet at: https://www.amazon.com/Mekar-Adjustable-Limiting-Comaptible-Wrangler/dp/B09CM58HM9?th=1.

(Continued)

*Primary Examiner* — Jeffrey O'Brien
(74) *Attorney, Agent, or Firm* — Endurance Law Group PLC

(57) ABSTRACT

Disclosed is a door hinge limiting assembly for a motor vehicle comprising a pillar bracket, a door bracket, and a flexible check strap. The pillar bracket is configured to fit on the aft-side and interior-side of the door pillar and to complement the pillar's nonplanar profile. Rather than being secured to the door pillar, the pillar bracket is secured to the forward wall in the footwell region, with the aforesaid configuration producing an interference fit with the door pillar. The strap may be comprised of nylon webbing or similar material, and in some embodiments may comprise an elastic strap to promote convenient folding.

16 Claims, 5 Drawing Sheets

Related U.S. Application Data

(60) Provisional application No. 63/251,364, filed on Oct. 1, 2021.

(51) Int. Cl.
*E05C 17/04* (2006.01)
*E05F 5/06* (2006.01)

(58) Field of Classification Search
CPC ...... E05C 17/163; E05C 17/166; E05C 17/18; E05C 17/20; E05C 17/203; E05C 17/206; E05C 17/22; E05C 17/24; E05C 17/26; E05C 17/28; E05D 11/10; E05F 5/06
See application file for complete search history.

(56) References Cited

U.S. PATENT DOCUMENTS 1,483,357 A * 2/1924 Leguillon ............... E05C 17/36 24/265 R
1,543,912 A * 6/1925 Gammeter .............. E05C 17/36 16/82
1,545,919 A * 7/1925 Oscarson ................ E05C 17/36 16/82
1,588,477 A * 6/1926 Kingston ................ E05C 17/36 16/82
1,646,580 A * 10/1927 Eastman ............... E05C 17/203 16/82
1,657,528 A * 1/1928 Eastman ............... E05C 17/203 16/82
1,752,423 A * 4/1930 Eastman ............... E05C 17/203 16/82
1,757,261 A * 5/1930 Simmons ................ E05C 17/36 16/82
1,810,003 A * 6/1931 Beck ....................... E05C 17/36 16/86 C
1,819,212 A * 8/1931 Toncray .................. E05C 17/36 16/82
1,832,708 A * 11/1931 Hughes ................. E05C 17/203 16/82
1,837,517 A * 12/1931 Ball ........................ E05C 17/36 16/82
RE18,397 E * 3/1932 Eastman ............... E05C 17/203 16/82
1,850,229 A * 3/1932 Eastman ............... E05C 17/203 16/82
2,187,941 A * 1/1940 King ....................... E05C 17/36 292/262
2,232,986 A * 2/1941 Westrope .............. E05C 17/203 16/86 C
3,570,043 A * 3/1971 Knudson ................. E05C 17/36 217/60 R
5,074,611 A 12/1991 Newkirk
5,173,991 A * 12/1992 Carswell ............... E05C 17/203 16/334
6,196,618 B1 3/2001 Pietryga et al.
6,447,043 B1 9/2002 VandenHeuvel et al.
6,711,778 B2 * 3/2004 Sparkman ............. E05C 17/203 16/82
6,901,630 B2 * 6/2005 Liang .................... E05C 17/203 16/86 B
6,948,214 B2 * 9/2005 Spalding ............. E05D 11/1085 16/83
7,304,239 B1 * 12/2007 Harris .................... H02G 11/00 296/146.7
8,549,711 B2 * 10/2013 Apostoloff .............. E05D 11/06 16/374
9,248,871 B1 * 2/2016 Waskie ................... E05C 17/36
9,751,462 B2 9/2017 Compton
10,519,701 B2 * 12/2019 Patterson .............. E05C 17/206
11,613,170 B2 * 3/2023 Neag ...................... B60J 5/0486 296/148
2021/0016922 A1 * 1/2021 Leng .................... B65D 43/167
2022/0025684 A1 * 1/2022 Kroll ....................... E05C 17/36

OTHER PUBLICATIONS

Bug Eye Guy Parts, Door check strap bracket set, Apr. 2022, Retrieved from the internet at: https://bugeyeguyparts.com/collections/interior-trim/products/door-check-strap-bracket-set.

Land Rover, Defender 90/110 Front Right Door Check Part—MWC5018, Downloaded Apr. 21, 2022 from:https://www.ebay.co.uk/itm/263245197307.

Moss Motors, Bracket, door check strap (inside door), Retrieved from the internet at: https://mossmotors.com/bracket-door-check-strap-inside-door?utm_source=feed&utm_medium=free&utm_campaign=shopping&gclid=EAlalQobChMIn9-iga6l9IVFMLCBB27lwCdEAsYBiABEgKrH_D_BwE, Feb. 2022.

* cited by examiner

DOOR HINGE LIMITER FOR AUTOMOTIVE VEHICLE

CROSS REFERENCE TO RELATED APPLICATIONS

This application claims priority to U.S. patent application Ser. No. 17/957,728 filed Sep. 30, 2022, which claims priority to provisional patent application No. 63/251,364 filed Oct. 1, 2021, the entire disclosure of which is hereby incorporated by reference and relied upon.

BACKGROUND OF THE INVENTION

Front doors of motor vehicles are usually hinged to the door pillar. Typically a hinge limiter such as a check arm is installed at the factory to prevent hyperextension of the door upon opening beyond design limits. However, many users complain that factory door hinge limiters are inadequate and subject to failure. Hyperextension can occur, for example, if a person opens the door too quickly or with excessive momentum, or if wind catches an open door. Hyperextension is particularly a problem with smaller commercial vehicles, such as smaller panel vans, including the Dodge Ram ProMaster van. These vans are more susceptible to hyperextension due to a combination of lighter doors, lighter/smaller hinge hardware (including factory door check arms), thinner steel at the door pillar, frequent door openings, and less-than-careful drivers. Other hinge limiters including factory door check arms frequently fail, causing substantial damage to the door and external features of the vehicle.

What is needed is a door hinge limiter that is affordable, easy to install, and works well under real-world conditions.

BRIEF SUMMARY OF THE INVENTION

Disclosed is a door hinge limiting assembly comprising a pillar bracket, a door bracket, and a flexible check strap. In one embodiment, the pillar bracket is configured to wrap around a portion of the door pillar being fabricated to complement the pillar's nonplanar profile. Rather than being secured to the door pillar, the pillar bracket is secured to the body of the vehicle, preferably in the footwell region. The strap may be comprised of nylon webbing or similar material, and in some embodiments may comprise an elastic strap to promote convenient folding.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
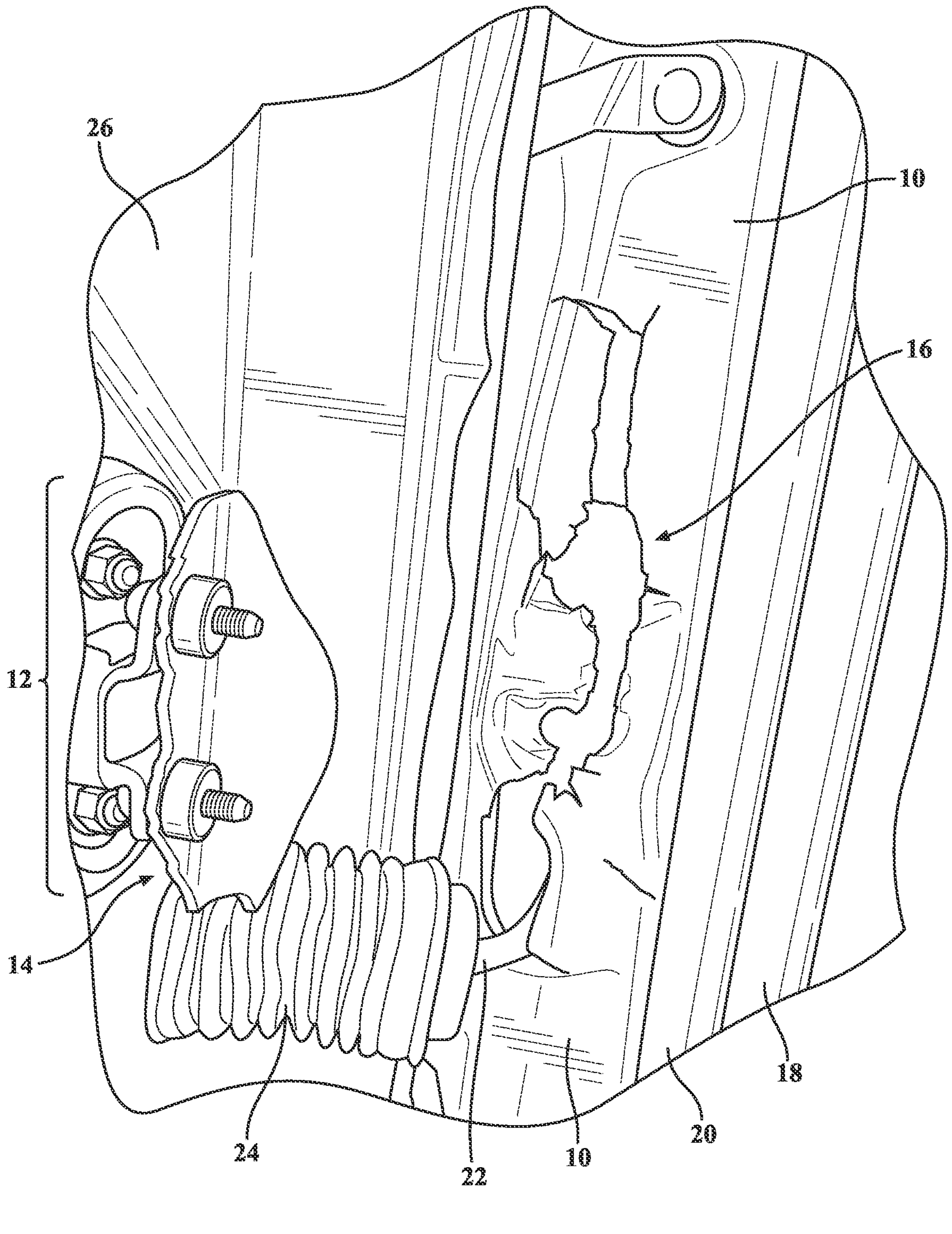
FIG. 1 (Prior Art)
FIG. 1 is a drawing of door pillar damage after violent hyperextension.

Referring to the figures, wherein like numerals indicate like or corresponding parts throughout the several views, FIG. 1 shows damage 16 to a door pillar 10 caused by hyperextension, such as when door 26 is violently opened or caught by a wind gust. Hinge assembly 12 (one of a pair of drive door hinge assemblies) remains attached to door 26, but hyperextension has caused the hinge assembly to detach from door pillar 10, leaving a fragment of the steel door pillar 14 dangling from hinge assembly 12. Damage 16 may include breakage and/or stripping of wire harness 22, as well as damage to protective wire harness boot 24. Such damage is frequently expensive to repair and may impose costly downtime.

Figure 2:
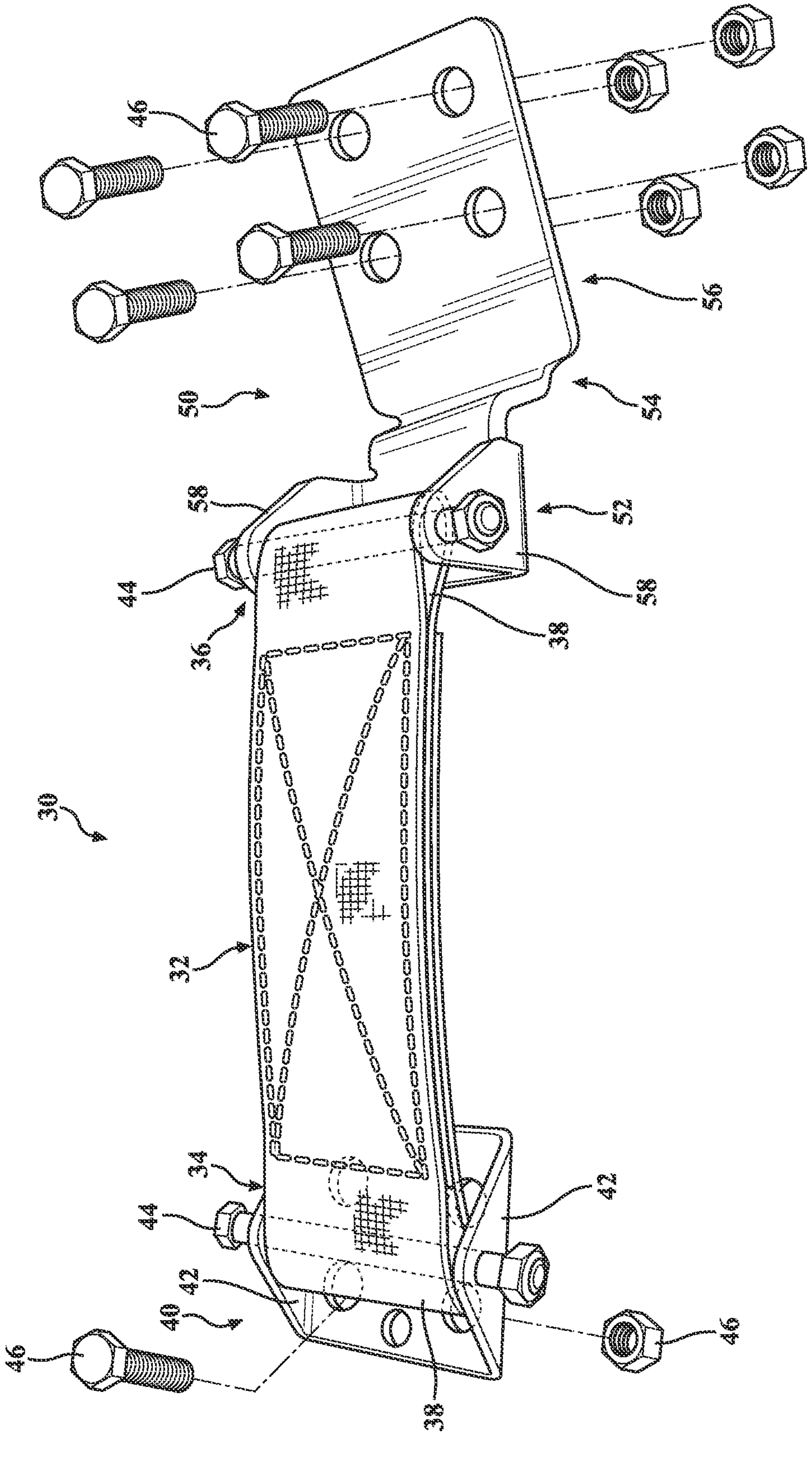
FIG. 2 is a perspective view of one embodiment of the hinge limiter assembly.

FIG. 2 shows one embodiment of a hinge limiter assembly 30. The assembly comprises a check strap 32 having a door end 34 and a body end 36. Check strap 32 is sized to appropriate length to allow door 26 to open sufficiently to allow convenient user ingress and egress, but short enough to prevent hyperextension of the door hinges and any factory check arm. In some embodiments check strap 32 is between four and ten inches long, and in a preferred embodiment check strap 32 is about seven inches long. The check strap is preferably bendable at one or more locations along its length and may be comprised of any suitable sturdy material, such as nylon webbing or other sturdy fabric, but could be comprised of cable, rope, chain, pivoting rigid sections, or any combination of the foregoing in materials such as steel, nylon, rayon, or other materials known in the art. In one embodiment check strap 32 may comprise a closed end loop 38 at either or both ends for conveniently securing the check strap to door bracket 40 and/or pillar bracket 50. Check strap 32 may be secured to either or both brackets using check strap securing means 44 of any type such as with a bolt and washer (pictured), metal pin, screws, rivets, welding, adhesives, or other securing means well known in the art.

Figure 5:
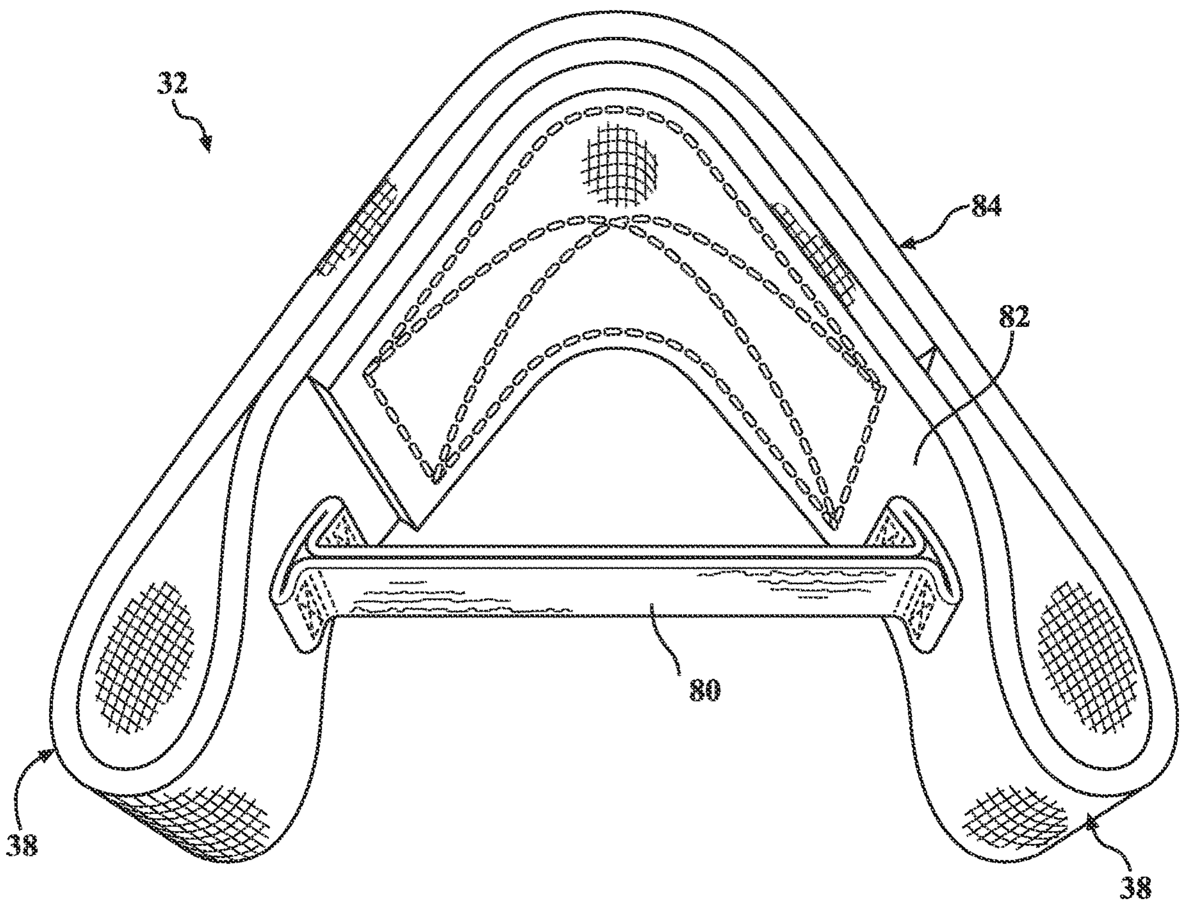
FIG. 5 is a perspective view of a check strap and attached fold promoter.

As illustrated in FIG. 5, in some embodiments check strap 32 may comprise a fold promoter 80. Fold promoter 80 may comprise an elastic material which may be sewn to the forward facing side 82 of check strap 32 (the side oriented towards the front of the vehicle) in order to promote check strap to fold/collapse with the folded edge oriented towards the rear of the vehicle. In a preferred embodiment, the user would see mainly the rearward facing side 84 of check strap 32. In other embodiments fold promoter 80 may comprise a spring that is secured within or on check strap 32, such as a thin piece of bent spring steel.

Returning to FIG. 2, hinge limiter assembly 30 may comprise a door bracket 40 attachable to door 26, preferably to a sturdy portion of the metal frame or panel facing inward toward the passenger cabin. In many or perhaps most applications, the most convenient mounting location for door bracket 40 may be covered with door trim, such as plastic, vinyl or upholstery. In some cases door bracket 40 may be installed directly on top of such trim, while in other cases it is preferable to remove some of the trim to expose the metal before securing the door bracket 40.

In other applications, hinge limiter assembly 30 may not comprise a door bracket; rather, check strap 32 may be secured directly to a portion of door 26 without use of a separate door bracket. For example, a door may be fabricated with features as original equipment that incorporates some of the same functions as the door bracket 40 depicted in FIG. 2, or integrate a mechanism to secure check strap 32 into door 26 without the necessity of a separate door bracket, e.g. at time of door/vehicle manufacture, such as preformed in a door panel or otherwise attached, such as with welding or bolts, etc.

In applications where a door bracket is desirable, the bracket is preferably rigid and more preferably metal. In one embodiment, door bracket 40 has opposing flanges 42 configured to accommodate the door-end 34 of check strap 32 and check strap securing means 44. In a preferred embodiment, flanges 42 are oriented approximately 90 degrees from the door bracket attachment surface. The attachment surface may be flat and comprise a plurality of holes to accommodate bracket attachment means 46, which may be bolts with nuts (shown), self-tapping bolts, screws, rivets, welds, adhesives, or other means well known in the art. In one embodiment, each of two opposing flanges 42 has a hole sized to accept check strap securing means 44, such as a pin or a bolt (shown) which may or may not also comprise a nut (shown). Check strap securing means 44 could also could comprise screws, weld, adhesive, hooks, tabs, a buckle, or other well-known securing means. In the embodiment shown, flanges 42 are configured to accept a pin or bolt that is generally vertically oriented.

Figure 3:
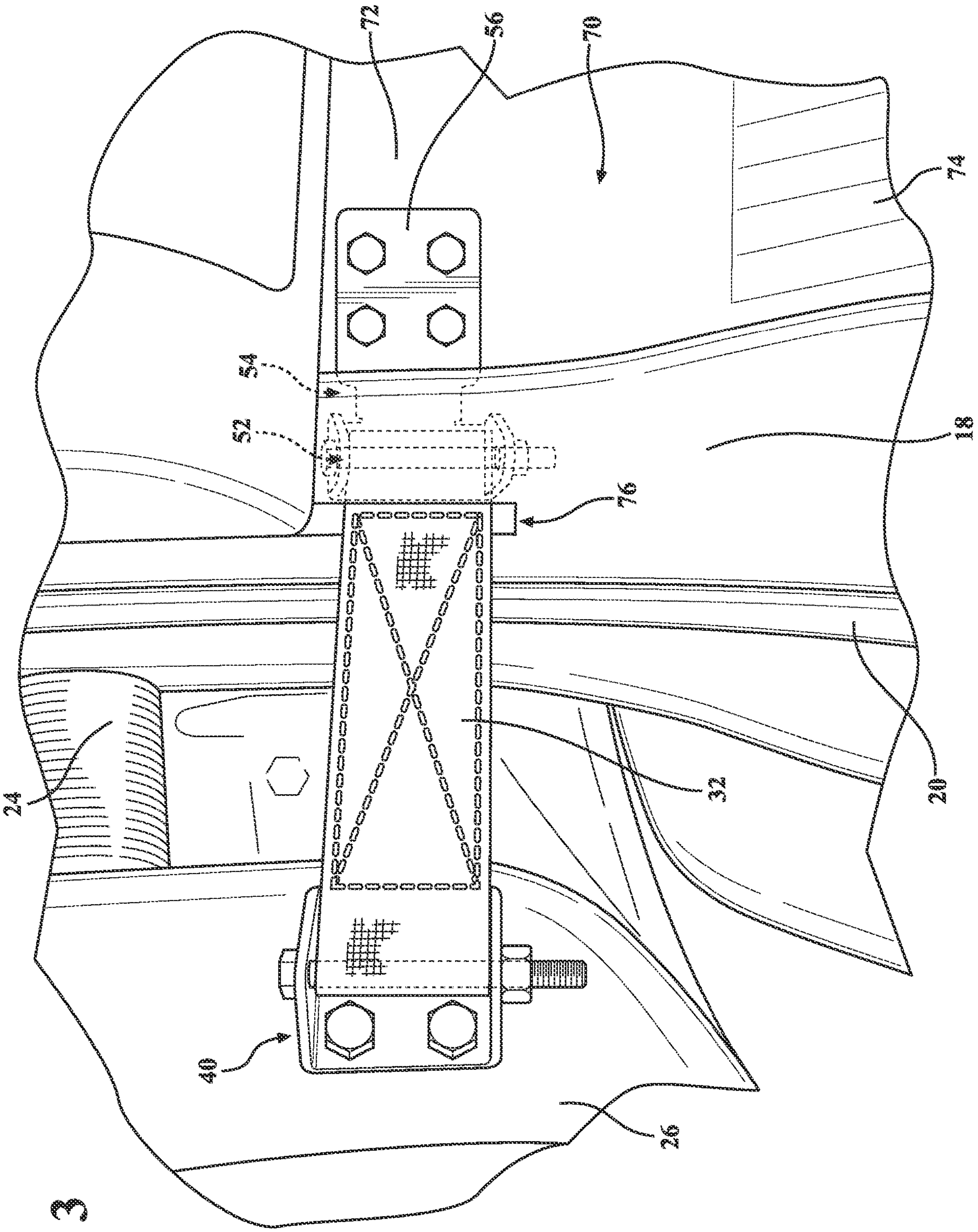
FIG. 3 is a view of one embodiment of the hinge limiter assembly installed in a motor vehicle.

Hinge limiter assembly 30 may comprise pillar bracket 50 attachable to the motor vehicle body. Pillar bracket 50 may optionally attach to the door pillar 10. FIG. 3 shows an embodiment where pillar bracket 50 is secured to the vehicle body's footwell region 70. For purposes of this specification and the claims, "footwell region" refers to those portions of the vehicle body that are immediately adjacent to and forward of door pillar 10 (hidden in FIG. 3 by sill trim 18) and including the floor 74 underneath the occupant's feet and further including forward wall 72, and further including the inward-facing portion of door pillar-10, i.e., those physical vehicle body parts forward of the leading edge of door 26 that partially define the space in which an occupant would normally place his/her feet while traveling. "Footwell region" does not include the airspace itself, nor the aft-facing side of door pillar 10, nor other portions of the vehicle body aft of door pillar 10. In most motor vehicles, forward wall 72 rises from floor 74 at a forward slant, roughly transverse to the line of vehicle travel. Forward wall 72, depending on the configuration of the vehicle, may also serve as a firewall between the occupancy area and the engine compartment or bulkhead.

Pillar bracket 50 is preferably comprised of a strong and stiff material such as metal and preferably steel. The bracket may be a unitary piece of metal or comprised of separate pieces welded or fastened together. In a preferred embodiment, pillar bracket 50 is a unitary piece of 3⁄16" (0.1875") thick steel alloy, such as is 1018 cold rolled steel, configured with dimensions complementing those of the vehicle body proximate to the attachment and abutment locations.

Figure 4A:
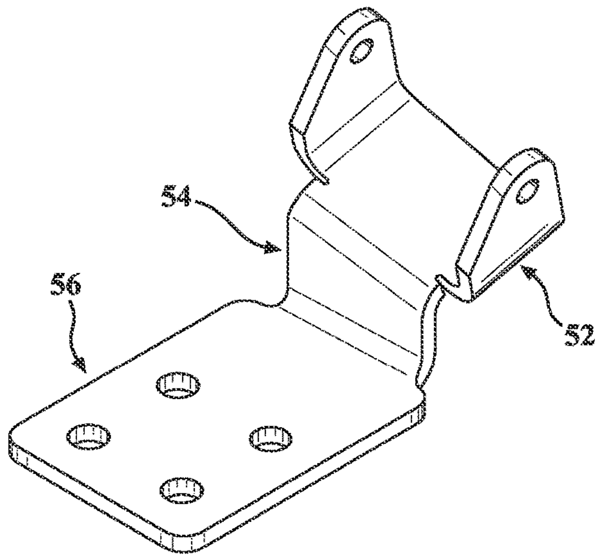
FIG. 4 (views A-D) are perspective, front, side, and top views of one embodiment of the invention.
Figure 4B:
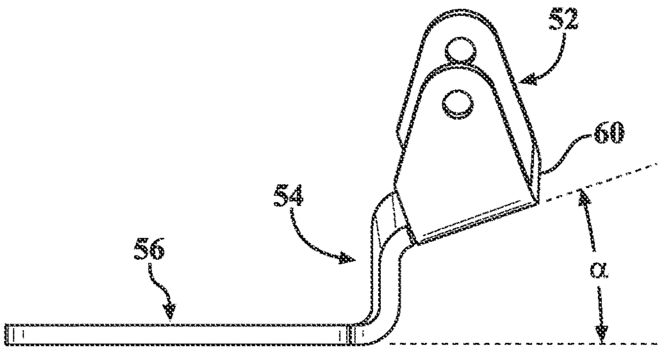
Figure 4C:
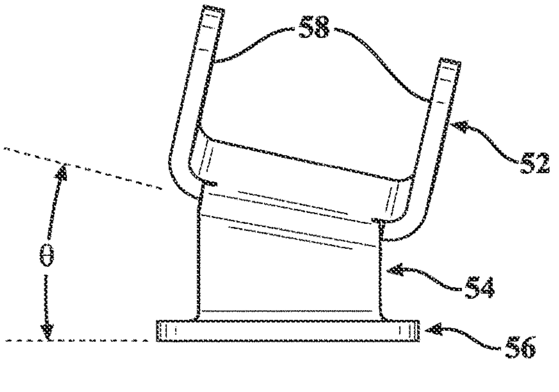
Figure 4D:
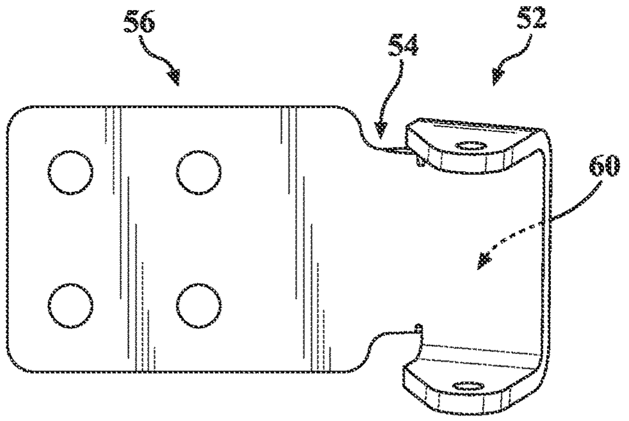

Pillar bracket 50 may be comprised of three regions: a check strap securement region 52 configured to accommodate one end of check strap 32; a body attachment region 56 configured to attach the pillar bracket to the vehicle body; and an intermediate region 54 extending between check strap securement region 52 and body attachment region 56. As best shown in FIGS. 4B and 4D, check strap securement region 52 has a pillar abutment surface 60 that is configured to abut door pillar 10 when pillar bracket 50 is installed on a motor vehicle, as depicted in FIG. 3. Similar to the means for securing door end 34 of check strap 32 to door bracket 40, check strap securement region 52 may comprise two opposing pillar bracket flanges 58 configured to accommodate and secure the body end 36 of check strap 32. Body end 36 of check strap 32 may be secured to pillar bracket 50 in check strap securement region 52 using any of the check strap securing means 44 described above, such as a bolt and nut (pictured), pin, etc. Similarly, pillar bracket flanges 58 may be oriented 90 degrees from pillar abutment surface 60. In one embodiment, pillar bracket flanges 58 extend about 1.75 inches measured from pillar abutment surface 60.

The other end of pillar bracket 50 comprises body attachment region 56. Body attachment region 56 may have a generally flat planar surface, which surface may comprise one or more holes configured to receive bracket attachment means 46 including one or more fasteners such bolts and nuts (pictured), self-tapping screws, rivets, and the like. Pillar bracket 50 may also be attached to the motor vehicle body at the body attachment region 56 using welding, adhesives, or other attachment techniques not requiring a fastener.

Pillar bracket 50 is configured to attach to the vehicle body in a convenient location other than (or in addition to) attachment to door pillar 10. In a preferred embodiment, the body attachment region 56 of pillar bracket 50 is configured to attach to the vehicle body at a location in footwell region 70, as defined above. Hinge limiter assembly 30, together with pillar bracket 50 may be attached to the vehicle body by a user after acquiring purchase as an "after-market" item, or the hinge limiter assembly, including pillar bracket 50, may be included as part of the vehicle's body as original equipment or otherwise integrated into the body, e.g., pillar bracket 50 "pre-attached" such as with welding or bolts, etc. or otherwise formed in footwell region 70 at time of first sale. In the embodiment shown in FIGS. 2-4, body attachment region 56 is configured to attach to forward wall 72 in a Dodge Pro Master motor vehicle, though Applicant believes his invention can be readily adapted to other models. In one embodiment, pillar bracket 50 is configured to be attached to the forward wall 72. In another embodiment, pillar bracket 50 is configured to be attached to the floor 74 of footwell region 70. Body attachment region 56 may comprise a plurality of holes sized to receive bracket attachment means 46, such as 3⁄8" diameter bolts with matching locknuts. Pillar bracket 50 may be attached so that the abutment surface of body attachment region 56 is installed directly against the vehicle's metal body or installed on top of any carpet, upholstery or trim that may cover structural body components in footwell region 70.

Intermediate region 54 of pillar bracket 50 extends from the check strap securement region 52 to body attachment region 56. Door pillars have a three-dimensional shape and though they may be relatively weak when subjected to highly concentrated lateral stress, such as encountered in a violent door opening, are generally strong in the columnar direction for strength and rigidity as in case of a roll-over accident, etc. The "profile" of door pillar 10 as used herein means the shape and dimensions of its outer surface, such as evidenced by its section profile when the pillar is cut by a series of imaginary planes transverse to the column orientation. The "profile" is not necessarily that originally supplied by the manufacturer. In some cases, a user may modify the door pillar 10 to modify its profile in the area where pillar bracket 50 is to be installed. For example, installation of pillar bracket 50 may be facilitated by eliminating any substantial protrusion originally manufactured along the door pillar 10 or in the nearby footwell region 70, such as a tab designed to assist in securing a wire harness 22, or a seam where two formed sheets of steel are joined. In some cases, for example, it may be preferable to eliminate a protrusion (or a portion of a larger protrusion) such as resulting from a wire harness tab, pinch weld, or from a seam on or near door pillar 10, to facilitate installation of hinge limiter assembly 30, pillar bracket 50, and/or weather strip 20. In the case of the Ram Pro Master vehicle, for example, an OEM wire harness tab protrusion is preferably hammered over to lay flat against the surface of the pillar to facilitate a good fit of pillar bracket 50 with the dimensions shown in the figures. "Profile" as used herein means the profile of the door pillar accepting attachment of pillar bracket 50, regardless whether the door pillar surface has been modified from its original profile.

The door pillar profile will be nonplanar as one traces around door pillar 10 from its aft side to the side facing the vehicle's interior, and possibly continuing a short distance around the door pillar away from the vehicle interior (i.e., toward the outside of the vehicle). The surface profile of the door pillar may be relatively simple (e.g. essentially a generally vertical column having generally flat sides) or feature more complex surface variants, including a plurality of planes, curves, bends and other nonplanar surface shapes depending on the original manufacturer's design (and any post-manufacture alteration as discussed above).

In one embodiment illustrated in FIGS. 2-4, check strap securement region 52 abuts the aft side of door pillar 10 at pillar abutment surface 60. Pillar bracket 50 then transitions into the intermediate region 54 which wraps forward and partially around door pillar 10. The substrate in intermediate region 54 is angled at a plurality of locations to complement the nonplanar profile of door pillar 10 and the surface profile of footwell region 70 forward of door pillar 10, including the forward wall 72 and any transition region between door pillar 10 and forward wall 72. The pillar bracket 50 may comprise a plurality of bends at a plurality of locations in intermediate region 54, and may also comprise one or more bends at a compound angle within intermediate region 54.

The pillar bracket 50 depicted in FIG. 4, for example, comprises a unitary metal substrate of uniform thickness bent at three locations within the intermediate region 54. Referring to FIG. 4B, intermediate region 54 is angled approximately 90 degrees relative to body attachment region 56, whose generally planar surface defines a first axis. Intermediate region 54 then changes direction at angle $\alpha$ relative to the first axis. As best seen in FIGS. 4B and 4C, this second bend is made at a compound angle, such that intermediate region 54 is also bent at angle $\theta$ relative to a second axis orthogonal to the first axis. In one embodiment, angle $\alpha$ is about 19° relative to the first axis, i.e. between 16° and 22° relative to the first axis. In the same embodiment, angle $\theta$ is about 12.5° relative to the second axis, i.e. between 9.5° and 15.5° relative to the second axis.

Intermediate region 54 is thus configured to complement the surface dimensions and nonplanar profile of door pillar 10 of the relevant motor vehicle. Preferably, all three regions of pillar bracket 50 complement the pillar's aft and inward-facing surfaces, as well as the surface profile of footwell region 70 that is immediately adjacent to door pillar 10. In some embodiments a plurality of angles and related dimensions will be necessary to appropriately complement the vehicle body surfaces in the transition area between door pillar 10 and forward wall 72. In the embodiment shown in the figures, pillar bracket 50 is not fastened to pillar bracket 10; rather, pillar bracket 50 is fastened to the body only in the footwell region. Thus in the illustrated embodiment, no holes or other means of attaching pillar bracket 50 to the vehicle body are present in either intermediate region 54 or pillar abutment surface 60; rather, the surfaces of intermediate region 54 and pillar abutment surface are smooth and uninterrupted by holes. In the shown embodiment, other than a friction interference fit, pillar bracket 50 is not secured or attached to pillar bracket 10.

When thus configured, pillar bracket 50 may be securely attached to the footwell region distant from the door pillar while exploiting the convenient position and available strength of door pillar 10 by virtue of an interference fit along most or all of intermediate region 54 with door pillar 10 and body structure in its proximity. By virtue of the described design, force of a violent door opening is transferred through check strap 32 to (a) the footwell region 70 where pillar bracket 50 is attached and (b) laterally towards the inward-facing surface of door pillar 10 over a relatively large surface area by virtue of the interference fit, rather than pulling away from door pillar 10 at a few hinge assembly 12 attachment points as depicted in FIG. 1.

In most embodiments, installation of hinge limiter assembly 30 will not interfere with reinstallation of OEM weather strip 20. By modestly trimming a few inches of OEM sill trim 18, the embodiment shown in the figures permits sill trim 18 to be reinstalled over most of the check strap securement region 52 and intermediate region 54. A substantial portion of check strip securement region 52, including pillar bracket flanges 58, are configured to fit underneath the original cavity between door pillar 10 and sill trim 18 as originally manufactured, thus minimizing intrusion of the assembly into the passenger cabin and providing an aesthetically clean look, as shown in FIG. 3.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. A hinge limiter assembly for a door hingeably attached to a motor vehicle body at a door pillar, the vehicle body comprising a footwell region that is defined by the door pillar, a floor, and a forward wall, the hinge limiter assembly comprising:

a check strap for connecting the body and the door; and a pillar bracket attachable to the body, said pillar bracket comprising:

- a check strap plate configured to accommodate a first end of the check strap, said check strap plate comprising a pillar abutment surface,
- a body attachment plate configured for direct attachment to the forward wall of the footwell region, and
- an intermediate plate extending from the check strap plate to the body attachment plate, said intermediate plate comprising:
  - a first bend that terminates at the body attachment plate and,
  - a second bend that terminates at the check strap plate.

2. The hinge limiter assembly of claim 1, wherein the intermediate plate is configured to complement a nonplanar surface between the door pillar and an attachment location of the vehicle body forward of the door pillar.

3. The hinge limiter assembly of claim 1, wherein the pillar abutment surface is formed without holes for accepting a fastener.

4. The hinge limiter assembly of claim 1, wherein the intermediate plate is formed without holes for accepting a fastener.

5. The hinge limiter assembly of claim 1, wherein the body attachment plate comprises a plurality of holes for receiving fasteners for attachment to the forward wall.

6. The hinge limiter assembly of claim 1, further comprising a door bracket for attachment to the door and securing a second end of the check strap.

7. The hinge limiter assembly of claim 1, wherein the first bend is 90 degrees and the second bend is between 16 degrees and 22 degrees.

8. The hinge limiter assembly of claim 1, wherein said intermediate plate comprises a first edge extending from the first bend to the second bend, and a second edge extending from the first bend to the second bend, and wherein the first edge is longer than the second edge.

9. The hinge limiter assembly of claim 1, wherein the pillar bracket is metal.

10. The hinge limiter assembly of claim 1, wherein the pillar abutment surface comprises a pair of flanges that extend away from the pillar abutment surface.

11. The hinge limiter assembly of claim 1, wherein the check strap comprises a means for promoting folding of the check strap when the door is closed.

12. The hinge limiter assembly of claim 11, wherein the means for promoting folding comprises elastic sewn on a forward side of the check strap.

13. A hinge limiter assembly for a door hingeably attached to a vehicle body at a door pillar, the vehicle body comprising a footwell region that is defined by the door pillar, a floor, and a forward wall, the hinge limiter assembly comprising:

a check strap for connecting the body and the door, a pillar bracket attachable to the body, said pillar bracket comprising:

a check strap plate configured to accommodate a first end of the check strap, said check strap plate comprising a pillar abutment surface, a body attachment plate comprising at least one hole for receiving one or more fasteners for direct attachment to the forward wall of the footwell region, and an intermediate plate extending from the check strap plate to the body attachment plate, said intermediate plate comprising at least two bends and configured to complement a nonplanar surface between the door pillar and the forward wall.

14. The hinge limiter assembly of claim 13, wherein the check strap comprises a means for promoting folding of the check strap when the door is closed.

15. The hinge limiter assembly of claim 14, wherein the means for promoting folding comprises elastic.

16. The hinge limiter assembly of claim 13, further comprising a door bracket for attachment to the door and securing a second end of the check strap.

* * * * *